, 
United States Patent [19]

Schwarz

[11] Patent Number: 4,625,767

[45] Date of Patent: Dec. 2, 1986

[54] KEY COUPLING FOR A ROTATION DOBBY

[75] Inventor: Rudolf Schwarz, Horgen-Zuerich, Switzerland

[73] Assignee: Staeubli Ltd., Horgen-Zuerich, Switzerland

[21] Appl. No.: 694,878

[22] Filed: Jan. 25, 1985

[30] Foreign Application Priority Data

Jan. 28, 1984 [EP] European Pat. Off. ........ 84100901.2

[51] Int. Cl.$^4$ .............................................. D03C 1/00
[52] U.S. Cl. ..................................................... 139/76
[58] Field of Search ...................... 139/76, 66 R, 66 A

[56] References Cited

U.S. PATENT DOCUMENTS 3,724,511  4/1973  Kleiner ............................ 139/66 R
4,493,346  1/1985  Speich ..................................... 139/76

FOREIGN PATENT DOCUMENTS 1535258  5/1970  Fed. Rep. of Germany .
1405184  of 1965  France .............................. 139/66 R
1305638  of 1966  France .............................. 139/66 R
1089821  11/1967  United Kingdom .

Primary Examiner—Henry S. Jaudon
Assistant Examiner—Joseph S. Machuga
Attorney, Agent, or Firm—Flynn, Thiel, Boutell & Tanis

[57] ABSTRACT

An eccentric ring is rotatably supported between a drive shaft and a connecting rod. Two coupling keys are independently radially movably supported on the eccentric ring. The first key, during a coupling operation, is radially moved by an inner cam and is held in engagement with a groove in the shaft during a 180° rotation thereof. The second key can move radially between positions respectively engaging the groove and an outer cam on an indexing ring and, for a holding-still phase, is moved outwardly by an edge of the shaft groove into an enlargement in the outer cam. Through the second key being in the enlargement and through a cam on the indexing ring which engages a gap between two noses on the eccentric ring, the eccentric ring is held against rotation. When the first key is moved inwardly, an edge of the groove engages it and thus rotates the eccentric ring and the second key, which slides on a ramp of the enlargement and is moved into the shaft groove. The lifting unit operates without springs moving the keys.

8 Claims, 12 Drawing Figures

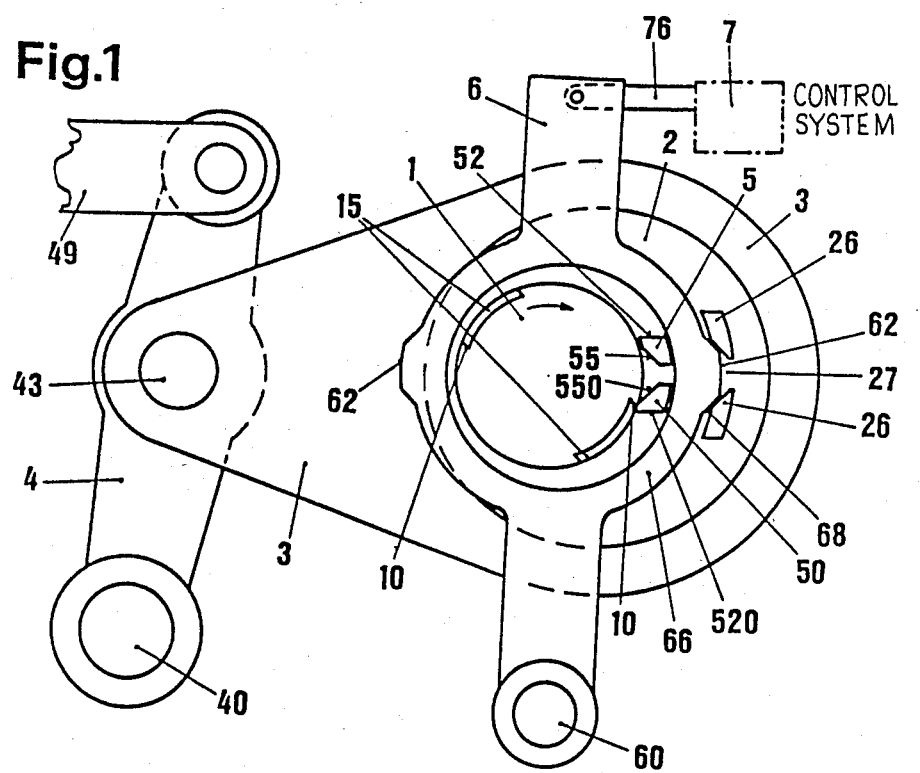

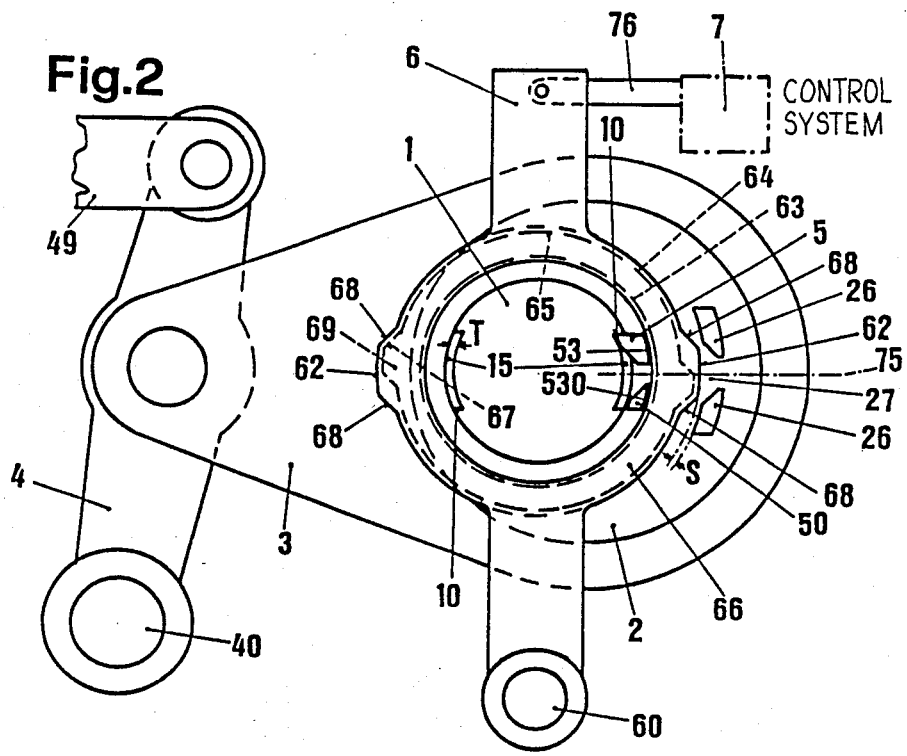
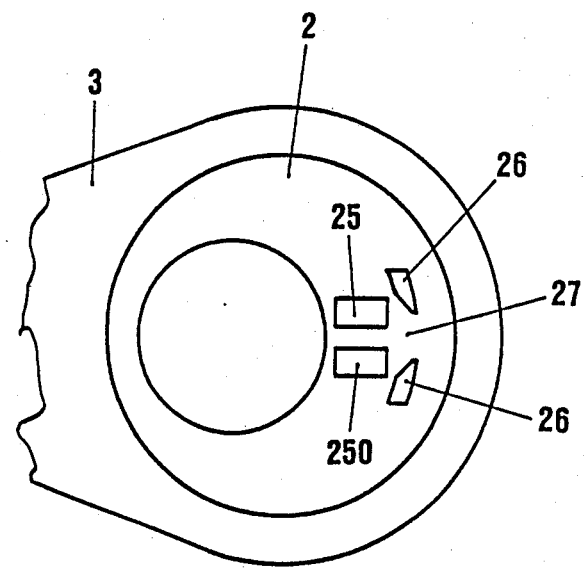

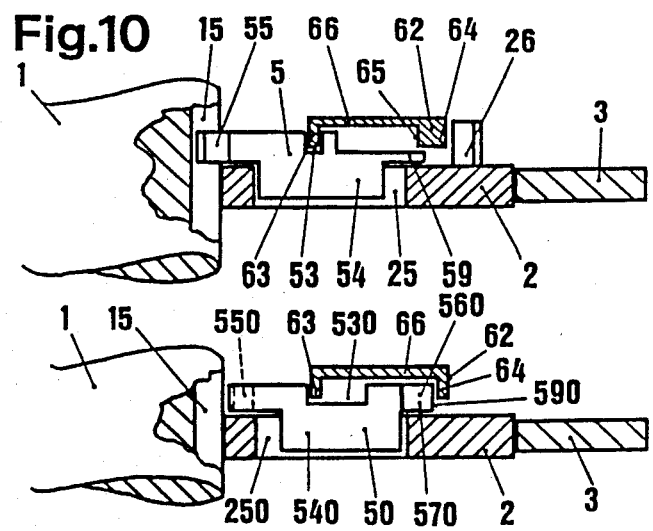
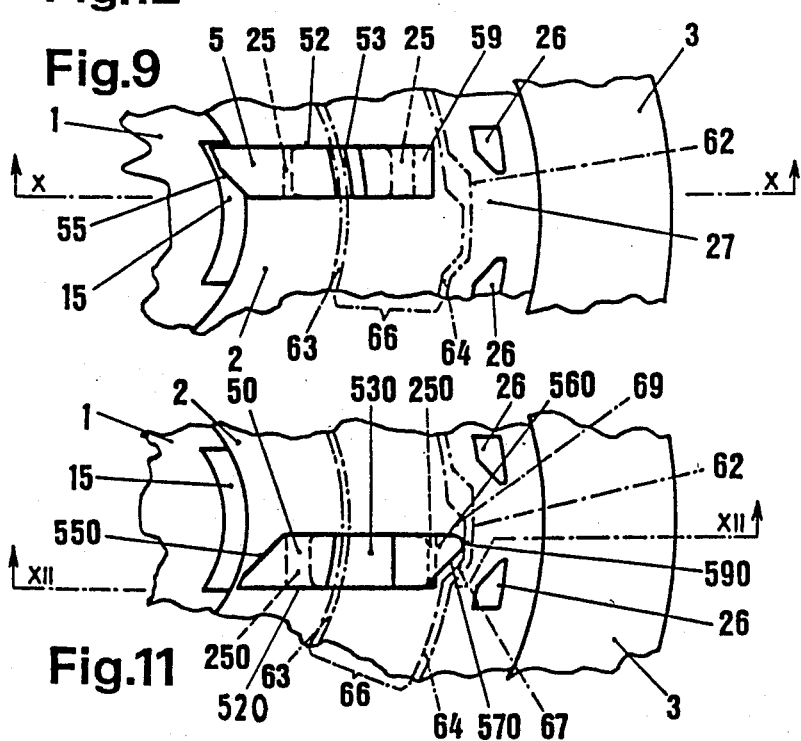

KEY COUPLING FOR A ROTATION DOBBY

FIELD OF THE INVENTION

The invention relates to a key coupling located between a drive shaft and an eccentric ring of a rotation dobby, the eccentric ring being freely rotatably supported on the drive shaft and a connecting rod being freely rotatably supported on the eccentric ring, including a control switching arm having an indexing ring which is approximately concentric with respect to the drive shaft and can be swung back and forth with respect to the drive shaft in a radial plane thereof, and including two keys which can engage a groove of the drive shaft and are supported approximately radially movably on the eccentric ring, one said key being used to carry along the eccentric ring and the other key being adapted to hold back the eccentric ring or to keep the driving key engaged play-free in the groove of the drive shaft, the driving key being controlled directly and the hold-back key indirectly.

BACKGROUND OF THE INVENTION

Rotation lifting units for operating the heddle frames of a weaving machine have become known on the one hand from British Pat. No. 1 089 821 and German Pat. No. 1 535 258, in which the coupling between the drive shaft and eccentric ring is effected by two individually movable, side-by-side keys which can engage the same groove, the keys having a common control member. The main characteristic is that each key engages the groove under the action of an initially tensioned spring. The advantage of these embodiments is the capability for anticipatory control, namely, initiating the control which will cause one key to move into the groove before the groove is positioned fully in front of the keys.

On the other hand, U.S. Pat. Nos. 3,726,323 and 3,724,511 disclose rotation lifting units for operating the heddle frames of a weaving machine in which a single key effects the coupling under control of a swingable switching arm with an indexing ring in its center, the key being controlled during a standstill of the drive shaft. In practice, this key has been provided with springs, by which it is held during the rotation of the drive shaft.

In the case of the first mentioned lifting units, there exists the disadvantage that the springs, in order to assure a quick movement of the keys, must be strong and dimensioned correspondingly large. Their physical dimensioning, however, is limited by the fact that they must be arranged within the thickness of one lifting unit, for example the usual 12 mm.

One purpose of the invention is thus the provision of a key coupling which permits a high speed of the drive shaft to be achieved and which eliminates the mentioned disadvantages, in particular installation of springs for biasing the keys.

SUMMARY OF THE INVENTION

This is attained by providing a key coupling of the above-mentioned type in which the indexing ring has two controlling cams which each cooperate with a respective one of the keys, the first controlling cam directly controlling movement of the driving key which in turn controls coupling and releasing of the eccentric ring to and from the drive shaft, and the second controlling cam, through its shape and through the position of the indexing ring effected by its control movement for the driving key, permitting the hold-back key to be moved by the drive shaft or its grooves and to be moved by the second controlling cam in response to movement of the eccentric ring by the hold-back key.

Such an arrangement has, for example, two keys per lifting unit and no springs for their operation. A first key is controlled by a first controlling cam of a control arm which is movable between three positions about the drive shaft, wherein the first key, during the coupling operation and during its movement through 180°, is guided constantly by the first controlling cam. A second key is controlled by a second controlling cam of the indexing ring, the second key being moved, during the uncoupling operation, out of the longitudinal groove of the drive shaft, where it act as a countersupport for the first key, and being moved during the coupling operation into engagement with the longitudinal groove. The second key constantly engages a guideway on the second cam during its movement through 180°.

This arrangement permits the control or coupling operations to be initiated prior to the start or end of rotation of the drive shaft of 180°, which reduces the duration of the control periods and thus the duration of the working cycle of the lifting unit.

BRIEF DESCRIPTION OF THE DRAWINGS

One exemplary embodiment of the invention is illustrated in the drawings, in which:

FIGS. 1 and 2 are each a side view of a lifting unit of a rotation dobby embodying the invention, FIG. 1 illustrating a first phase of operation and FIG. 2 illustrating a second phase of operation;

FIG. 8 is a fragmentary side view of a connecting rod and of an eccentric ring which is arranged between the drive shaft and the connecting rod;

FIG. 9 is a fragmentary side view of the coupling showing one of the two keys;

FIG. 10 is a sectional view taken along the line X—X of FIG. 9;

FIG. 11 is a fragmentary side view of the coupling showing the other key; and

FIG. 12 is a sectional view taken along the line XII—XII of FIG. 11.

DETAILED DESCRIPTION

Figures 3, 4:
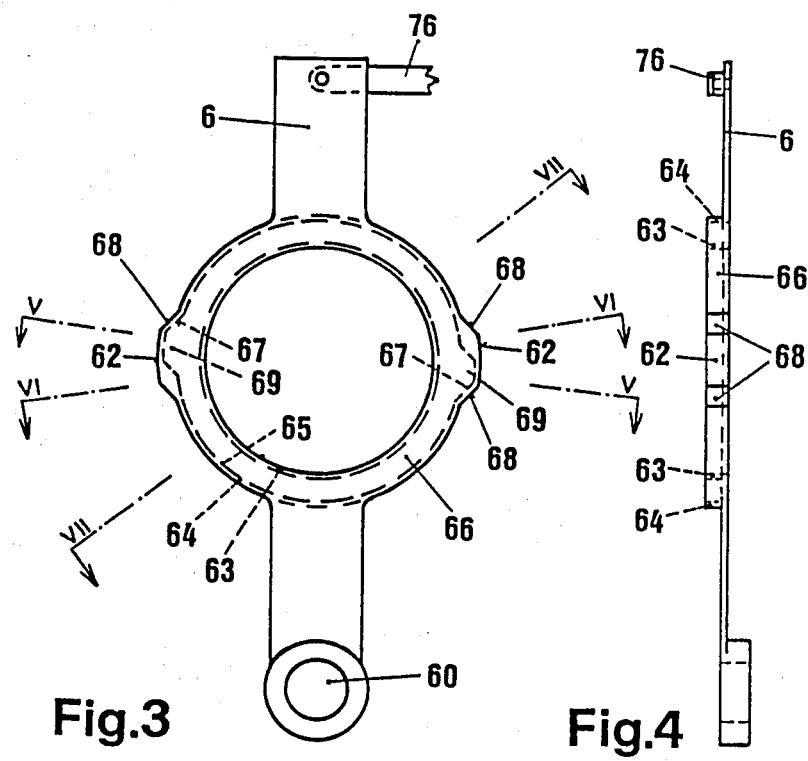
FIG. 3 is a side view of a switching arm which is a component of the inventive lifting unit.
FIG. 4 is an end view of the switching arm of FIG. 3.

The basic design of the lifting unit with a rotational drive, as shown in FIG. 1, corresponds approximately with one of the exemplary embodiments disclosed in U.S. Pat. No. 3,724,511. Parts of the dobby which are not important for the inventive function, such as its housing, are not illustrated.

Between a continuously or intermittently rotating drive shaft 1 and a connecting rod 3 is a freely rotatable and axially nonmovable eccentric ring 2, which has therein two approximately radially extending windows or slotlike openings 25 and 250 (FIGS. 10 and 12) respectively slidably supporting two driving keys 5 and 50, and which has, radially outwardly of the windows 25 and 250, two noses 26 which project axially beyond a side surface of the ring 2. Two longitudinal grooves 15, which are diametrically opposite one another, are provided in the drive shaft 1. The connecting rod 3 is pivotally connected by a bolt 43 to a one-arm rocking lever 4 which is pivotally supported on a stationary axle 40 and to which is connected a connecting rod 49 which is coupled to a conventional and not illustrated heddle frame of a weaving machine.

The switching arm 6, which controls the key coupling, has in its center region an indexing ring 66 and is pivotally supported on a stationary axle 60. Its free end is connected by a rod or plate 76 to a conventional control system 7 which is preferably controlled by a not-illustrated pattern card.

Figure 5:
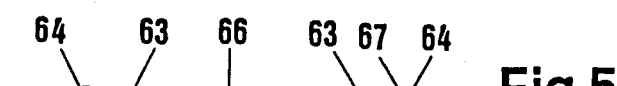
FIG. 5 to 7 are sectional views of an indexing ring of the switching arm of FIG. 3 respectively taken along the lines V—V, VI—VI, and VII—VII of FIG. 3.
Figure 6:
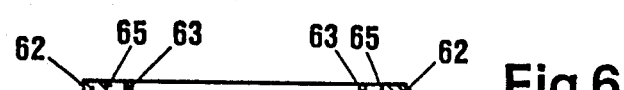
Figure 7:
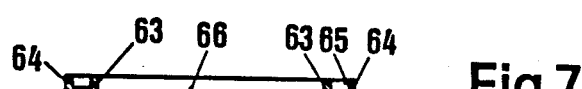

As is illustrated in FIGS. 3, 5 to 7, 10 and 12, the indexing ring 66 has, viewed in cross section and over its entire circumference, a varying U-shape. In the portions thereof which control engagement of the keys 5 and 50 in the grooves 15 of the drive shaft, the indexing ring 66 has on each side a cam 62 which projects radially outwardly beyond its periphery and which, for the purpose of locking the eccentric ring 2 in its uncoupled position, can engage a gap 27 which is formed between the two noses 26 of the eccentic ring 2.

The leg of the U-shape which is provided at the radially inner edge of the indexing ring 66 serves as a first controlling cam 63 for the first key or wedge (driving key 5), and is constructed as an inner collar which engages a sliding groove 53 in the driving key 5 so as to actively and directly control the driving key 5 during rotational movement of the ring 2 and coupling and uncoupling of the key 5. The leg of the U-shape which is provided at the radially outer edge of the indexing ring 66 serves as a second controlling cam 64 for the second key (hold-back key 55), and is constructed as an outer collar which has in the region of each radially projecting cam 62 an enlargement 69, the width of each enlargement 69 being at least as large as the depth T (FIG. 2) of the arcuate grooves 15 in the shaft 1.

The two keys 5 and 50 are of different shape. Their radially inner ends each have, mirror-symmetrically with respect to a center axis 75 between the keys 5 and 50 and between the windows 25 and 250, an inclined flank or surface 55 and 550, respectively. The longitudinal sides 52 and 520 of the two keys, which sides 52 and 520 do not face each other, extend parallel to one another and parallel to the center axis 75.

The key 5, which is the first key encountered in the direction of rotation of the drive shaft 1 and which effects rotational movement of the eccentric ring 2, has in its center region a sliding groove 53 which is curved so as to correspond with the radius of the inner controlling cam 63 and which slidably receives cam 63. In comparison to the end of the key 5 which has the inclined flank 55, the center part is constructed as a downwardly projecting block 54 which is slidingly disposed in the window 25.

The key 50, which is the second key encountered in the direction of rotation of the drive shaft 1 (see the arrow in FIG. 1) and which works as a hold-back or counter-holder with respect to the driving key in the arcuate groove 15, is not controlled by the inner cam 63. Its sliding groove 530, which receives cam 63, is for this reason very wide. Its outer end has a thickened portion 560 which, during rotational movement of the key 50 caused by rotational movement of the eccentric ring 2, engages with its inclined surface 570 a ramp 67 on the enlargement 69 of the outer controlling cam 64, which causes the key 50 to be moved radially inwardly.

Aside from the enlargements 69, the inner wall 65 of the second controlling cam 64 is constructed as a guideway which slidably engages the rounded outer end 590 of the thickened portion 560 of the hold-back key 50 during rotational movement of the key 50. The length of the key 50 therefore corresponds with the radial distance from the inner edge 65 of the second controlling cam 64, at locations spaced from the enlargements 69, to the bottom of the longitudinal grooves 15 in the shaft 1.

The function of the described lifting unit and its operation will be discussed in greater detail hereinafter.

FIG. 1 illustrates the position of the driveshaft 1 after a rotation of approximately 45° from its coupling position. In the present case, the driving key 5 was moved radially to the right by the first controlling cam 63 of the switching arm 6, and the hold-back key 50 was then moved rightwardly by the trailing edge 10 of the arcuate groove 15 in the rotating shaft, so that ring 2 does not move and the lifting unit holds the heddle frame locked in an upper-shed position. The driving key 5 is held by the inner collar of the first controlling cam 63 of the indexing ring 66, while the hold-back key 50 rests with its inner end sliding on the drive shaft 1. The hold-back key 50 remains with its outer end part 590 in the enlargement 69 of the second controlling cam 64 of the indexing ring 66, which position is reached as a consequence of the controlling movement imparted by the indexing ring 66 to the driving key 5, as described above. The peripheral cam 62 of the indexing ring simultaneously engages the gap 27 between the noses 26, and thus forcibly holds the eccentric ring 2 against rotation caused by friction with the drive shaft 1. This standstill position is maintained until the next longitudinal groove 15 of the drive shaft reaches the region of the keys 5 and 50.

As soon as a groove 15 starts to slide past the driving key 5, which corresponds to the coupling position of the drive shaft 1, it is possible, if a change of the heddle frame into the lower shed is supposed to take place, to swing the switching arm 6 counterclockwise about the fixed axle 60 into its center position (FIG. 2), which moves the carried-along driving key 5 a slightly larger distance than the distance T, T being the depth of the groove 15. The engagement of the key 5 in the groove 15 then occurs. The indexing ring 66 is at this time concentric to the drive shaft 1. The drive shaft is, in this coupling position, preferably briefly stopped. However, it can rotate continuously. The driving key 5 is carried along by the trailing edge 10 of the arcuate groove 15. Through the key 5 which has its block 54 supported in the window 25, the eccentric ring 2 is rotated, and because the block 540 of the hold-back key 50 is supported slidingly in the window 250, the key 50 is also carried along. The outer, rounded end 590 of the key 50 then engages the ramp 67 of the inner wall 65 of the collar of the second controlling cam 64 and is moved radially inwardly into engagement with the groove 15. The carrying along of the eccentric ring 2 is effected by the actively controlled driving key 5 which, in a radial direction, is held by the first controlling cam 63 of the indexing ring 66, the cam 63 engaging its sliding groove 53. The hold-back key 50 has its inner end in the groove 15, while the rounded end part 590 of the outer end thickened portion 560 slides along the inner wall 65 of the second controlling cam 64. The key 50 is thus controlled indirectly or passively and functions during rotation of the eccentric ring 2 only when the ring 2, during its rotation, is no longer accelerated but decelerated. In particular, the key 50 prevents a rushing ahead or an uneven run of the eccentric ring 2 relative to the drive shaft 1 or its groove 15.

If the heddle frame is supposed to again change its position after a rotation of the drive shaft 1 of 180°, then the switching arm 6 is kept in its center position, in which the indexing ring 66 is positioned concentrically with respect to the drive shaft 1.

Alternatively, if a shed change of the heddle frame is not supposed to occur, the shifting arm 6 is, after the drive shaft has carried out a rotation of approximately 180°, swung counterclockwise to the left, which causes the driving key 5 to be moved radially outwardly and a cam 62 to engage the gap 27 between the noses 26. Based on the standstill of the eccentric ring 2, which standstill is caused by the disengagement of the key 5 from the groove 15, further rotation of the drive shaft 1 will cause the trailing edge 10 of the groove 15 to engage the inclined flank 550 of the hold-back key 50 and to move same radially outwardly, which is possible because the outer end 590 of the key 50 is aligned with an enlargement 69 of the second controlling cam 64. In this matter, the hold-back key 50 is prevented from continuing to rotate, and facilitates the holding of the ring 2 by the cam 62 of the indexing ring 66, which cam engages the gap 27.

It can be taken from the foregoing description of operation that the inventive key coupling makes possible a control of the driving key 5 even prior to the full arrival of the groove 15 at the coupling position, which makes possible a shortening of the normal control period. In fact, instead of intermittent rotational steps of 180°, it is possible for the drive shaft to rotate continuously, since the stopping of the eccentric ring 2 by the hold-back key 50, which ultimately moves into the enlargement 69, occurs outside of the direct control period.

FIGS. 9 and 10 illustrate the driving key 5 which is moved by the inner controlling cam 63 of the indexing ring 66 and can engage the arcuate groove 15 of the drive shaft 1 before the shaft 1 fully reaches its coupling position.

In an alternative arrangement which is not illustrated, in place of the cam 62 the end 59 of the driving key 5 which does not face the driving shaft can be extended radially so as to project sufficiently far under the indexing ring 66 that it engages, in the driven-out position of the key, a gap formed by noses 26 arranged on the connecting rod 3 instead of the ring 2, the locking of the eccentric ring 2 occurring through the window 25 in which the key 5 is supported rather than through the cams 62, which is possible both in the lower-shed and the upper-shed positions.

FIGS. 11 and 12 illustrate the hold-back key 50 in a position spaced from the arcuate groove 15 of the drive shaft 1, uninfluenced by the first controlling cam 63. When the drive shaft 1 is in the standstill phase or the eccentric ring 2 is in the locking position, then the key 50 remains uncontrolled.

The indexing ring 66, for the purpose of a clearer illustration, is drawn in dash-dotted lines in FIGS. 9 and 11.

In order for the eccentric ring 2 to rotate unhindered while simultaneously keeping the control movement of the keys 5 and 50 short, the distance S (FIG. 2) between the noses 26 and the head of the cam 62 is preferably selected to be smaller than the depth T of the longitudinal grooves 15. The inclination of the side surfaces 68 of the cams 62 is such that one of the cams, before the full locking position of the longitudinal groove 15 of the drive shaft 1 is reached, can move into the gap 27.

In order that, after each 180° rotation of the drive shaft 1, a change in coupling can occur, the switching arm 6 can be moved into three positions.

The coupling achieves anticipatory control totally without springs, with which a substantial source of error is eliminated and considerable production and maintenance costs can be saved. However, if desired, the fixed noses 26 of the eccentric ring 2 can be resilient for safety reasons. The lifting unit works only when rotation of the drive shaft takes place in the direction of the arrow in FIG. 1.

Although a particular preferred embodiment of the invention has been disclosed in detail for illustrative purposes, it will be recognized that variation or modification of the disclosed apparatus, including the rearrangement of parts, lie within the scope of the present invention.

The embodiments of the invention in which an exclusive property or privilege is claimed are defined as follows:

1. A key coupling cooperable with a drive shaft and an eccentric ring of a rotation dobby, the eccentric ring being freely rotatably supported on the drive shaft and a connecting rod being freely rotatably supported on the eccentric ring, comprising a controlling switching arm having an indexing ring which is movable to a center position approximately concentric with respect to the drive shaft and can be swung back and forth with respect to the drive shaft in a radial plane thereof, and two keys which can each engage a groove of the drive shaft and are each supported on the eccentric ring for movement approximately radially of the drive shaft, one said key being a driving key used to effect rotation of the eccentric ring with the drive shaft and the other key being a hold-back key adapted to hold back the eccentric ring and to keep the driving key engaged play-free in the groove of the drive shaft, wherein the indexing ring has two controlling cams which each cooperate with a respective one of said keys, the first controlling cam directly and positively effecting all movement of the driving key relative to the eccentric ring in each radial direction and the driving key in turn controlling coupling and releasing of the eccentric ring to and from the drive shaft, and the second controlling cam, through its shape and in dependence on the position of the indexing ring, permitting the hold-back key to be directly and positively moved radially outwardly by the drive shaft in response to rotation of the drive shaft relative to the eccentric ring, and directly and positively effecting radially inward movement of the hold-back key in response to rotational movement of the eccentric ring relative to the second controlling cam by the driving key.

2. The key coupling of a rotation dobby according to claim 1, wherein the key coupling is free of springs resiliently biasing the keys.

3. The key coupling of a rotation dobby according to claim 2, wherein the first controlling cam of the indexing ring is concentric to the drive shaft in the center position of the switching arm in which the keys engage the arcuate groove in and rotate with the drive shaft, and wherein the first controlling cam constantly slidably engages a sliding groove provided in the driving key.

4. The key coupling of a rotation dobby according to claim 2, wherein the second controlling cam of the indexing ring is, over almost its entire circumference, concentric to the drive shaft in the center position of the switching arm in which the keys engage the groove in and rotate with the drive shaft, and wherein the second controlling cam has, in diametrically opposite regions which are angularly aligned with the grooves in the shaft when the shaft is in its coupling position, two enlargements which are spaced farther from the drive shaft than the remainder of the second controlling cam and which each have two lateral ramps which can slidably engage the hold-back key and move it radially inwardly.

5. The key coupling of a rotation dobby according to claim 4, wherein the radial length of the hold-back key is greater than the radial distance between the external surface of the drive shaft and the inner edge of the second controlling cam at locations spaced from the enlargements therein.

6. A key coupling cooperable with a drive shaft and an eccentric ring of a rotation dobby, the eccentric ring being freely rotatably supported on the drive shaft and a connecting rod being freely rotatably supported on the eccentric ring, comprising a controlling switching arm having an indexing ring which is movable to a center position approximately concentric with respect to the drive shaft and can be swung back and forth with respect to the drive shaft in a radial plane thereof, and two keys which can each engage a groove of the drive shaft and are each supported on the eccentric ring for movement approximately radially of the drive shaft, one said key being a driving key used to effect rotation of the eccentric ring with the drive shaft and the other key being a hold-back key adapted to hold back the eccentric ring and to keep the driving key engaged play-free in the groove of the drive shaft, wherein the indexing ring has two controlling cams which each cooperate with a respective one of said keys, the first controlling cam directly controlling movement of the driving key which in turn controls coupling and releasing of the eccentric ring to and from the drive shaft, and the second controlling cam, through its shape and in dependence on the position of the indexing ring, permitting the hold-back key to be moved by the drive shaft in response to rotation of the drive shaft relative to the eccentric ring and to be moved by the second controlling cam in response to rotational movement of the eccentric ring relative to the second controlling cam by the driving key, wherein the key coupling is free of springs resiliently biasing the keys, and wherein sides of the two keys which do not face one another are parallel to one another and parallel to a center axis which lies between the keys and which is at the same time the centerline of the groove in the shaft when the shaft is in a coupling position, the width of the groove, measured in a direction circumferentially of the shaft, being at least as large as the distance between said sides of said keys.

7. The key coupling of a rotation dobby according to claim 6 wherein side surfaces of the two keys which face one another each have an incline at the inner end thereof.

8. A key coupling cooperable with a drive shaft and an eccentric ring of a rotation dobby, the eccentric ring being freely rotatably supported on the drive shaft and a connecting rod being freely rotatably supported on the eccentric ring, comprising a controlling switching arm having an indexing ring which is movable to a center position approximately concentric with respect to the drive shaft and can be swung back and forth with respect to the drive shaft in a radial plane thereof, and two keys which can each engage a groove of the drive shaft and are each supported on the eccentric ring for movement approximately radially of the drive shaft, one said key being a driving key used to effect rotation of the eccentric ring with the drive shaft and the other key being a hold-back key adapted to hold back the eccentric ring and to keep the driving key engaged play-free in the groove of the drive shaft, wherein the indexing ring has two controlling cams which each cooperate with a respective one of said keys, the first controlling cam directly controlling movement of the driving key which in turn controls coupling and releasing of the eccentric ring to and from the drive shaft, and the second controlling cam, through its shape and in dependence on the position of the indexing ring, permitting the hold-back key to be moved by the drive shaft in response to rotation of the drive shaft relative to the eccentric ring and to be moved by the second controlling cam in response to rotational movement of the eccentric ring relative to the second controlling cam by the driving key, wherein on the periphery of the indexing ring there are diametrically opposed cams, and wherein the eccentric ring has two noses which form a gap for receiving said cams.

* * * * *